(12) United States Patent
Ono

(10) Patent No.: US 12,063,703 B2
(45) Date of Patent: Aug. 13, 2024

(54) COMMUNICATION DEVICE, CONTROL METHOD, AND STORAGE MEDIUM

(71) Applicant: CANON KABUSHIKI KAISHA, Tokyo (JP)

(72) Inventor: Kaede Ono, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 17/702,630

(22) Filed: Mar. 23, 2022

(65) Prior Publication Data

US 2022/0322478 A1 Oct. 6, 2022

(30) Foreign Application Priority Data

Mar. 30, 2021 (JP) ................ 2021-058382

(51) Int. Cl.
*H04W 76/18* (2018.01)
*H04L 43/0823* (2022.01)
*H04W 48/16* (2009.01)
*H04W 4/80* (2018.01)

(52) U.S. Cl.
CPC ......... *H04W 76/18* (2018.02); *H04L 43/0847* (2013.01); *H04W 48/16* (2013.01); *H04W 4/80* (2018.02)

(58) Field of Classification Search
CPC ............... H04L 41/082; H04L 41/5058; H04L 43/0847; H04W 4/80; H04W 48/16; H04W 76/18
See application file for complete search history.

(56) References Cited

U.S. PATENT DOCUMENTS

| 11,800,340 | B2 * | 10/2023 | Lee ........................ H04W 4/80 |
| 2014/0065967 | A1 * | 3/2014 | Shen ..................... H04W 88/04 |
| | | | 455/41.2 |
| 2015/0147970 | A1 * | 5/2015 | Tan ...................... H04W 12/06 |
| | | | 455/41.2 |
| 2016/0156636 | A1 * | 6/2016 | Tan ........................ H04W 4/80 |
| | | | 726/4 |
| 2016/0277875 | A1 * | 9/2016 | Ivanova ................ H04W 76/14 |
| 2017/0048655 | A1 * | 2/2017 | Kwon ..................... H04W 4/80 |
| 2017/0111863 | A1 * | 4/2017 | Kochery ............... H04W 8/005 |
| 2020/0196110 | A1 * | 6/2020 | Jakobsson ............ H04W 76/14 |

(Continued)

FOREIGN PATENT DOCUMENTS

JP 2016110208 A 6/2016

OTHER PUBLICATIONS

Core Specification Working Group. "Bluetooth Core Specification v5.2" Dec. 31, 2019. (Year: 2019).*

*Primary Examiner* — Stephen J Clawson
(74) *Attorney, Agent, or Firm* — Canon U.S.A., Inc. I.P. Division

(57) ABSTRACT

In a case where a version of Bluetooth supported by an information processing device is a predetermined version and service discovery by the information processing device is not completed, a notification unit executes an error notification using an error code of DATABASE OUT OF SYNC. In a case where the version of the Bluetooth supported by the information processing device is a version earlier than the predetermined version and the service discovery by the information processing device is not completed, the notification unit executes an error notification using an error code of INVALID HANDLE.

15 Claims, 12 Drawing Sheets

(56) References Cited

U.S. PATENT DOCUMENTS

| | | | |
|---|---|---|---|
| 2020/0396017 A1* | 12/2020 | Liu | H04W 4/80 |
| 2021/0076435 A1* | 3/2021 | Cheong | H04W 4/80 |
| 2022/0330180 A1* | 10/2022 | Tamma | H04L 69/22 |

* cited by examiner

FIG. 11

| Service UUID | Service Name | Characteristic UUID | Characteristic Name | Service Readability | Service Writability | Characteristic Readability | Characteristic Writability | Characteristic Indicatability | Value | Necessity of Paring |
|---|---|---|---|---|---|---|---|---|---|---|
| 0 x 1801 | GATT Service | 0 x 2A05 | Service Changed | ○ | | | | ○ | 0 | |
| | | 0 x 2B2A | Database Hash | | | ○ | | | F0 CA 2D 48 EC F5 8B AC 8A AA 30 BB B9 FB A9 90 | |
| 0 x 180A | Device information | 0 x 2A29 | Manufacturer Name String | ○ | | ○ | | | Printer Device | |
| | | 0 x 2A24 | Hardware Revision String | | | ○ | | | 1010_AAA | |
| | | 0 x 2A25 | Firmware Revision String | | | ○ | | | 2030000 | |
| | | 0 x 2A26 | Software Revision String | | | ○ | | | 1 | |
| 00000000-0000-1000-1000-00405 f9b34fb | IJ Original | 00000000-0000-2000-1000-00405 f9b34fb | SSID | ○ | | ○ | | | Printer SSID | ○ |
| | | 00000000-0000-2000-1000-00405 f9b34fc | Password | | | ○ | | | aaaabbbb | ○ |

FIG. 12

| BD ADDRESS OF CONNECTED DEVICE | DISCOVERY EXECUTED? |
|---|---|
| AA:BB:CC:DD:EE:FF | 1 |
| AA:AA:AA:BB:BB:BB | 1 |
| CC:CC:CC:DD:DD:DD | 1 |
| ⋮ | |

COMMUNICATION DEVICE, CONTROL METHOD, AND STORAGE MEDIUM

BACKGROUND

Field

The present disclosure relates to a communication device, a control method, and a storage medium.

Description of the Related Art

A device is known which is configured to communicate using Bluetooth Low Energy® (hereinafter referred to as BLE). Japanese Patent Laid-Open No. 2016-110208 discloses a technique of BLE-based communication between an information processing device such as a smartphone and a communication device such as a printer.

In BLE, a communication method called GATT (Generic Attribute Profile) communication is used in which data communication is performed by reading/writing to/from GATT data stored in a communication device. In order for an information processing device to perform communication by the GATT communication method, it is necessary to identify a configuration of GATT data held by the communication device. A process of acquiring information on the configuration of GATT data held by the communication device to grasp the configuration of the GATT data held by the communication device is referred to as a service discovery.

In a conventional technique, particularly, after the information processing device connects to a communication device, the information processing device completes a service discovery, and then performs GATT communication according to an instruction given by a user.

However, a situation may occur in which the service discovery by the information processing device is not completed due to a communication error, updating of a firmware of the communication device, or for other reasons.

SUMMARY

In order to handle, among other things, the above-described situation, various embodiments of the present disclosure provide a technique in which when a service discovery by an information processing device is not completed, an appropriate error notification is given to the information processing device.

According to one embodiment, the present disclosure provides a communication device configured to communicate with an information processing device by Bluetooth, including a transmission unit configured to, in a case where service discovery based on Bluetooth is started by the information processing device, transmit information regarding Generic Attribute Profile (GATT) data of the communication device to the information processing device, and a notification unit configured to, in a case where a version of Bluetooth supported by the information processing device is a predetermined version and the service discovery by the information processing device is not completed, execute an error notification using an error code of DATABASE OUT OF SYNC, and, in a case where the version of Bluetooth supported by the information processing device is a version earlier than the predetermined version and the service discovery by the information processing device is not completed, execute an error notification using an error code of INVALID HANDLE.

Further features of the present disclosure will become apparent from the following description of example embodiments with reference to the attached drawings.

BRIEF DESCRIPTION OF THE DRAWINGS

FIG. 11 is a table showing an example of GATT data stored in a short-range wireless communication unit according to one embodiment.

FIG. 12 is a diagram showing a storage format for storing information as to whether discovery has been performed by an information processing device which has been connected according to one embodiment.

DESCRIPTION OF THE EMBODIMENTS

Example embodiments of the present disclosure are described below with reference to the drawings. Note that various modifications and improvements may be made to the example embodiments described below without departing from the spirit and the scope of the disclosure as will be apparent to those skilled in the art. Note that such modified or improved embodiments also fall within the scope of the disclosure.

First Embodiment

An information processing device and a communication device included in a communication system according to a first embodiment are described below. In the following description of the present embodiment, a smartphone is taken as an example of the information processing device, but the information processing device is not limited to a smartphone. Examples of other devices employable as the information processing device include a mobile terminal, a notebook PC, a tablet terminal, a PDA (Personal Digital Assistant) device, a digital camera, etc. Furthermore, a printer is taken as an example of the communication device, but the communication device is not limited to a printer. Various devices may be used as the communication device as long as they can perform wireless communication with the information processing device. In a case where the communication device is a printer, the printer may be, for example, an inkjet printer, a full-color laser beam printer, a monochrome printer, or the like. The communication device may be not only a printer, but it may also be a copier, a facsimile machine, a mobile terminal, a smartphone, a notebook PC, a tablet terminal, a PDA, a digital camera, a music playback device, a television receiver, or the like. Another example of the communication device is a multi-function device having a plurality of functions such as a copying function, a facsimile function, a printing function, and/or the like.

Figure 1:
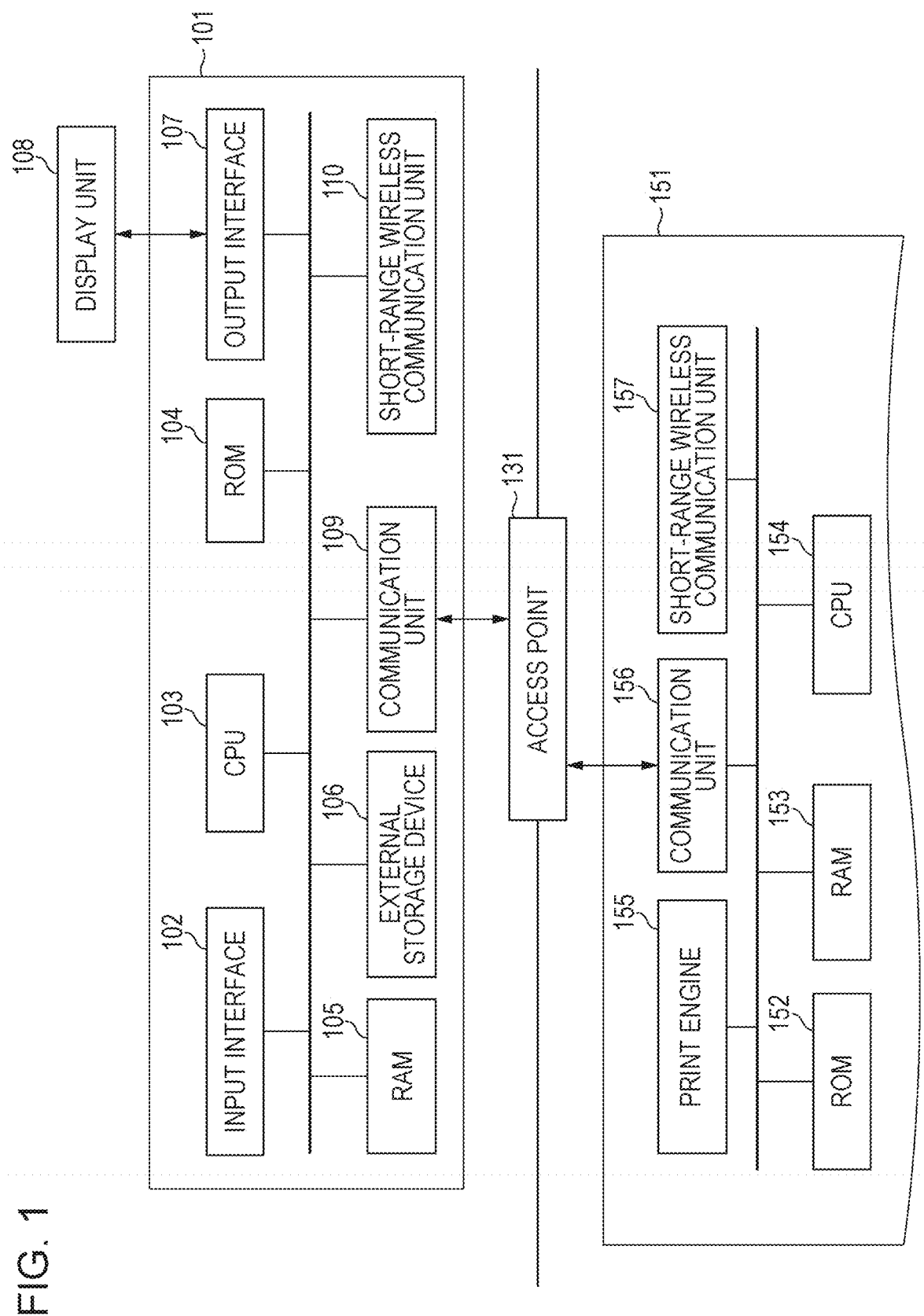
FIG. 1 is a diagram illustrating an example of a configuration of an information processing device and an example of a configuration of a communication device according to one embodiment.

A configuration of the information processing device according to the present embodiment and a configuration of the communication device capable of communicating with the information processing device according to the present embodiment are described below with reference to a block diagram shown in FIG. 1. Note that the configurations described below are merely examples and not limitations, and other configurations are possible as long as communication is possible between the information processing device and the communication device.

The information processing device 101 is an information processing device according to the present embodiment. The information processing device 101 includes an input interface 102, a CPU 103, a ROM 104, a RAM 105, an external storage device 106, an output interface 107, a display unit 108, a communication unit 109, a short-range wireless communication unit 110, and the like.

The input interface 102 is an interface for receiving data and/or an operation instruction input by a user. The input interface 102 may be realized by a physical keyboard, a button, a touch panel, and/or the like. Note that an output interface 107 and an input interface 102, which will be described later, may have the same configuration such that outputting of a screen and accepting an operation by a user are performed with this same configuration.

The CPU 103 is a system control unit configured to control the entire information processing device 101.

The ROM 104 stores fixed data such as a control program, a data table, and an embedded operating system (hereinafter referred to as an OS) executed by or used by the CPU 103. In the present embodiment, each control program stored in the ROM 104 executes and controls software such as scheduling, task switching, interrupt processing, and the like under the control of an embedded OS stored in the ROM 104.

The RAM 105 is realized using a SRAM (Static Random Access Memory) or the like that needs a backup power supply. The RAM 105 is backed up by a primary battery (not shown) functioning as a data backup battery such that data stored in the RAM 105 is retained and thus important data such as program control variables can be stored in a non-volatile manner. Furthermore, the RAM 105 has a memory area for storing setting information of the information processing device 101, management data of the information processing device 101, and/or the like. The RAM 105 is also used, by the CPU 103, as a main memory and a work memory.

The external storage device 106 stores an application program that provides a print execution function, a print information generation program that generates print information that can be interpreted by the communication device 151, and/or the like. The external storage device 106 also stores various programs such as a control program that controls transmission/reception of information to/from the communication device 151 connected via the communication unit 109, and stores various information used by these programs.

The output interface 107 is an interface for controlling the display unit 108 for displaying data and notifying the status of the information processing device 101.

The display unit 108 is composed of an LED (Light Emitting Diode), an LCD (Liquid Crystal Display), and/or the like, and displays data and notifies of the state of the information processing device 101. A soft keyboard including keys such as numerical input keys, a mode setting key, an enter key, a cancel key, a power key and/or the like may be provided on the display unit 108 thereby accepting inputting by a user via the display unit 108.

The communication unit 109 is configured to connect to a device such as the communication device 151 to execute data communication. For example, the communication unit 109 can connect to an access point (not shown) in the communication device 151. When the communication unit 109 directly connects to the access point in the communication device 151, the information processing device 101 and the communication device 151 can communicate with each other. The communication unit 109 may directly communicate with the communication device 151 by wireless communication, or may communicate via an external access point (the access point 131) existing outside the information processing device 101 or the communication device 151. Examples of the wireless communication method include a Wi-Fi (Wireless Fidelity) (trademark registration) communication and a Bluetooth (trademark registration) communication. An example of the access point 131 is a device such as a wireless LAN router. In the present embodiment, when the information processing device 101 and the communication device 151 are directly connected without interposition of an external access point, this connection method is referred to as a direct connection method. When the information processing device 101 and the communication device 151 are connected via an external access point, this connection method is referred to as an infrastructure connection method.

The short-range wireless communication unit 110 is configured to wirelessly connect to a device such as the communication device 151 at a short distance to execute data communication, wherein the communication is performed using a communication method different from that used by communication unit 109. The short-range wireless communication unit 110 is capable of connecting to the short-range wireless communication unit 157 in the communication device 151. In this embodiment, it is assumed that BLE is used as the communication method for the short-range wireless communication unit 157.

The communication device 151 is a communication device according to the present embodiment. The communication device 151 includes a ROM 152, a RAM 153, a CPU 154, a print engine 155, a communication unit 156, a short-range wireless communication unit 157, and the like.

The communication unit 156 includes, inside the communication device 151, an access point for connecting to a device such as the information processing device 101. The access point is capable of connecting to the communication unit 109 of the information processing device 101. The communication unit 156 may directly communicate with the information processing device 101 by wireless communication, or may communicate via the access point 131. Examples of communication methods usable include IEEE 802.11 series (Wi-Fi®) and Bluetooth®). The communication unit 156 may include hardware that functions as an access point, or, in other embodiments, the communication unit 156 may have software that allows the communication unit 156 to function as an access point.

The short-range wireless communication unit 157 is configured to wirelessly connect to a device such as the information processing device 101 at a short distance. In the present embodiment, it is assumed that BLE is used as a communication method by the short-range wireless communication unit 157.

The RAM 153 is realized using an SRAM or the like that needs a backup power supply. The RAM 153 is backed up by a primary battery (not shown) functioning as a data backup battery such that data stored in the RAM 153 is retained and thus important data such as program control variables can be stored in a non-volatile manner. The RAM 153 includes a memory area for storing setting information of the communication device 151 and management data of the communication device 151. The RAM 153 is also used as a main memory and a work memory by the CPU 154. RAM 153 is also used to store various kinds of information, for example, it is used as a receive buffer for temporarily storing print information received from the information processing device 101 and/or other various kinds of information.

The ROM 152 stores a control program executed by the CPU 154, and fixed data such as a data table, an OS program, and/or the like. In the present embodiment, each control program stored in the ROM 152 executes and controls software such as scheduling, task switching, interrupt processing, and the like under the control of the embedded OS stored in the ROM 152.

The CPU 154 is a system control unit configured to control the entire communication device 151.

Based on information stored in the RAM 153 and a print job received from the information processing device 101 or the like, the print engine 155 forms an image on a recording medium such as paper using a recording agent such as ink, and the print engine 155 outputs a print result. In this process, the print job transmitted from the information processing device 101 or the like has a large transmission data size, and thus high-speed transmission may be employed. Therefore, the print job is received by the communication unit 156 capable of communicating at a higher speed than the short-range wireless communication unit 157.

A memory such as an external HDD or an SD card may be attached as an optional device to the communication device 151, and information stored in the communication device 151 may be stored in this memory.

In the present embodiment, the communication device has a connection mode which is set by a connection setting process, thereby communicating with the information processing device in a connection mode based on the set connection mode. In a case where the communication device according to the present embodiment performs communication by infrastructure connection, the infrastructure connection mode is set as the connection mode. In a case where the communication is performed by direct connection, the direct connection mode is set as the connection mode.

The information processing device 101 and the communication device 151 share their roles in the processing in the above-described manner, but this is merely an example and, in other embodiments, the roles may be shared in a different manner.

In the present embodiment, it is assumed that the information processing device 101 stores a predetermined application program in the ROM 104, the external storage device 106, or the like. The predetermined application program is, for example, an application program for transmitting a print job for printing image data, document data, etc. stored in the information processing device 101 to the communication device 151. The application program having such a function is hereinafter referred to as a printing application program. The printing application program may have another function in addition to the printing function. For example, in a case where the communication device 151 has a scanning function, the printing application program may have a function of scanning a document set on the communication device 151, a function of making another setting of the communication device 151, confirming a state of the communication device 151, and/or the like. That is, the printing application program may have a function of transmitting a scan job or a setting job to the communication device 151 in addition to the print job. Note that the predetermined application program is not limited to the printing application program. For example, the predetermined application program may be an application program having a function other than printing.

Figure 2:
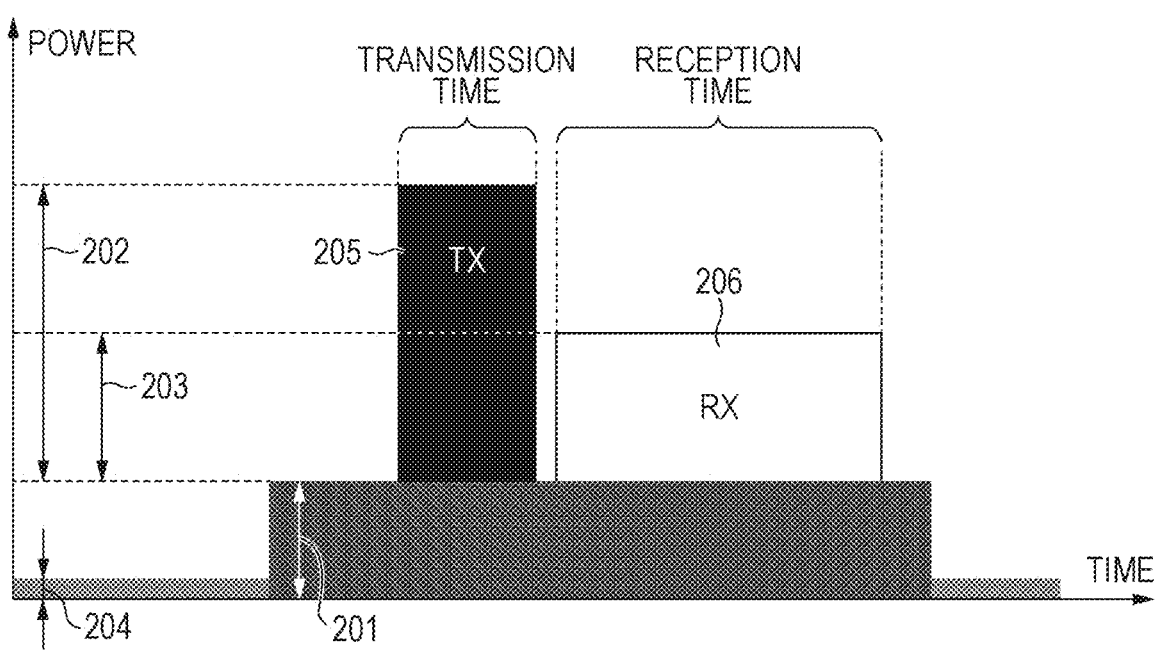
FIG. 2 is a diagram for explaining a process of broadcasting advertisement information and receiving connection request information according to one embodiment.

In the present embodiment described below, it is assumed that the short-range wireless communication unit 110 and the short-range wireless communication unit 157 communicate with each other via BLE. In the present embodiment, the short-range wireless communication unit 157 functions as an advertiser (or a slave) that broadcasts advertisement information described later at predetermined intervals, and the short-range wireless communication unit 110 functions as a scanner (or a master) that receives the advertisement information. It is also assumed that the communication unit 109 and the communication unit 156 communicate using a wireless LAN (Wi-Fi) communication. A process of transmitting advertisement information according to the BLE standard and a process of receiving a BLE connection request are described below. In the present embodiment, as described above, the short-range wireless communication unit 157 operates as a slave device, and thus the short-range wireless communication unit 157 performs the processes described above. The short-range wireless communication unit 157 divides a 2.4 GHz frequency band into 40 channels (0th to 39th channels) and communicates using these channels. The short-range wireless communication unit 157 uses the 37th to 39th channels for transmitting advertisement information and receiving a BLE connection request, and uses the 0th to 36th channels for data communication after a BLE connection is established. FIG. 2 shows power consumed when advertisement information is transmitted using one channel in each of various processes where a vertical axis shows power consumption of the short-range wireless communication unit 157 and a horizontal axis shows time. Tx 205 indicates a total power consumption in a transmission process in which advertisement information is transmitted, and Rx 206 indicates a total power consumption in a reception process during which a receiver for receiving a BLE connection request is kept enabled. A transmission power 202 indicates an instantaneous power consumption in a transmission process. A reception power 203 indicates an instantaneous power consumption in a reception process. A microcomputer operation power 201 indicates an instantaneous power consumed when a microcomputer in the short-range wireless communication unit 157 is operating. The reason why the microcomputer operates before Tx 205, during Tx 205, between Tx 205 and Rx 206, during Rx 206, and after Rx 206 is that, to execute or stop the transmission/reception process, the microcomputer needs to be started in advance. In a case where advertisement information is transmitted using a plurality of channels, the power consumption increases by a factor corresponding to the number of channels used for transmitting the advertisement information. A sleep power 204 indicates an instantaneous power consumed when the microcomputer is not operating and the short-range wireless communication unit 157 is in a power saving state. As described above, after the short-range wireless communication unit 157 performs a transmission process using the predetermined channel, the short-range wireless communication unit 157 performs a reception process for a certain period of time using the same channel to wait for a BLE connection request to be received from the information processing device 101.

Figure 3:
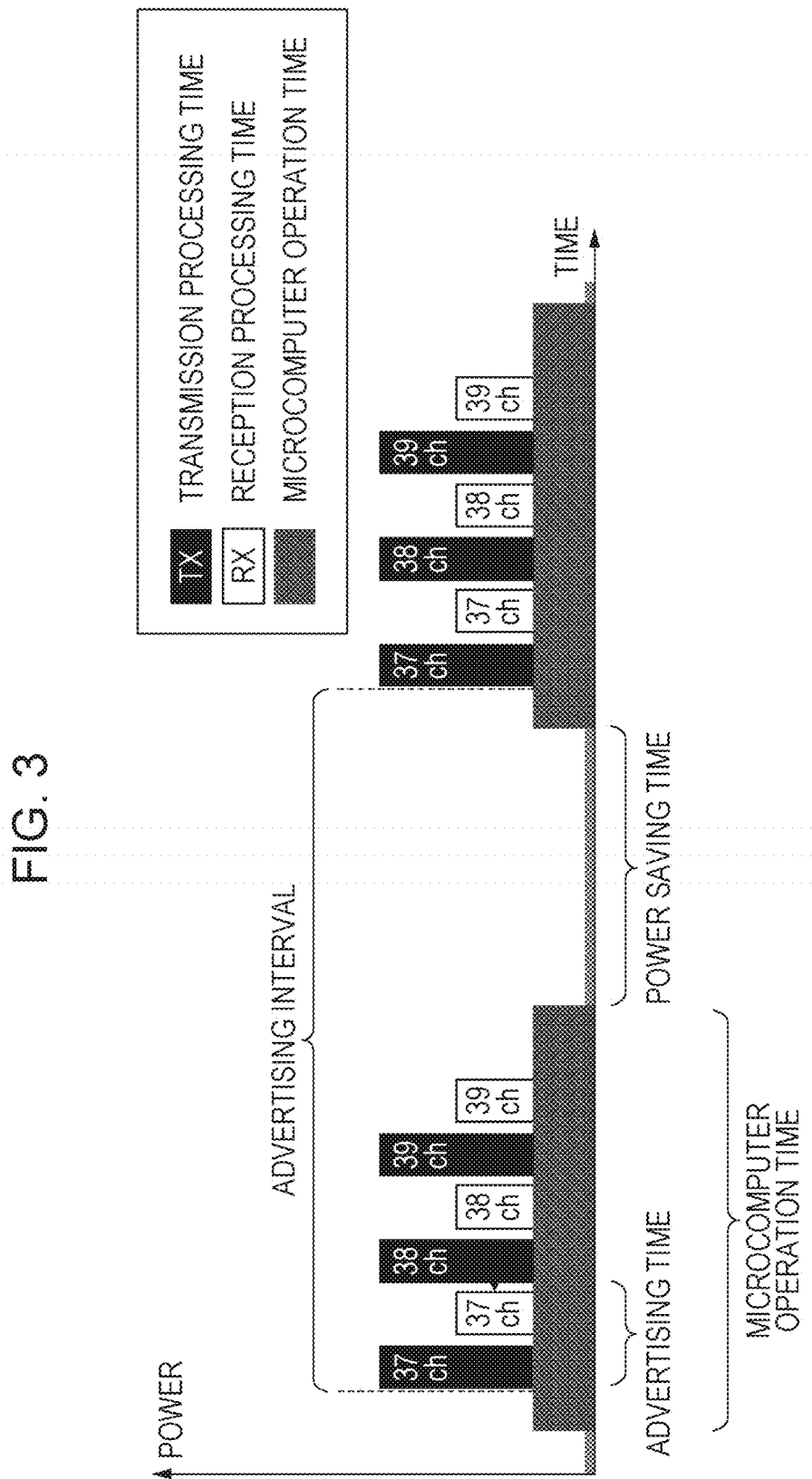
FIG. 3 is a diagram for explaining advertising in BLE according to one embodiment.

As shown in FIG. 3, after the short-range wireless communication unit 157 repeats the transmission process of the advertisement information and the reception process three times via each channel, the short-range wireless communication unit 157 stops the operation of the microcomputer and enters a power saving state for a certain period of time. Hereinafter, a combination of a transmission process of advertisement information and a reception process using a predetermined channel is referred to as advertisement. Hereinafter, a time interval between two adjacent processes of transmitting advertisement information using a predetermined channel is referred to as an advertising interval. The number of advertisements repeated since the first advertisement until entering the power saving state can be arbitrarily changed as long as the number is equal to or smaller than 3. In FIG. 3, when advertisement is performed, the channels are used in order of the 37th, 38th, and 39th channels, but the order of channels may be random. The order may be different among the first advertisement, the second advertisement, and the third or subsequent advertisements.

Figure 9:
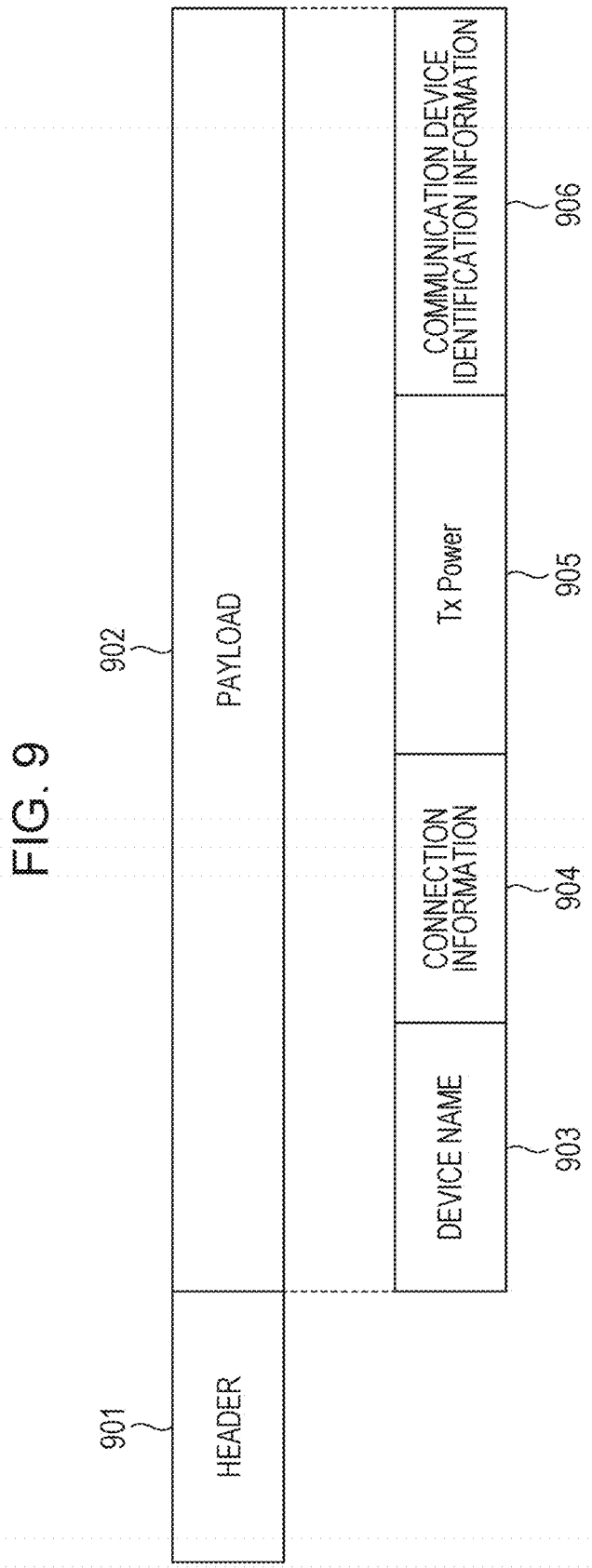
FIG. 9 is a diagram showing a structure of advertisement information according to one embodiment.

FIG. 9 shows an example of a structure of advertisement information broadcast by the short-range wireless communication unit 157 to the surroundings of the communication device 151.

When supplying power to the short-range wireless communication unit 157 is started, the short-range wireless communication unit 157 performs an initialization process and enters an advertising state. When the short-range wireless communication unit 157 is in the advertising state, the short-range wireless communication unit 157 periodically broadcasts advertisement information to the surroundings according to the advertising interval. The advertisement information is a signal including basic header information (identification information for identifying the device that transmits the advertisement information, etc.), and includes a header 901 and a payload 902. By receiving this advertisement information, the information processing device 101 can recognize the existence of the communication device 151. Furthermore, by transmitting a BLE connection request to the communication device 151, the information processing device 101 can make a BLE connection with the communication device 151. The header 901 is a field for storing information indicating a type of advertisement information, a size of the payload 902, and the like. The payload 902 stores identification information which is information indicating a device name 903, available profile information, connection information 904 for BLE connection with the communication device 151, information indicating transmission power (Tx Power) 905 of the advertisement information, and the like. The advertisement information may include identification information 906 identifying the communication device. Examples of the identification information 906 identifying the communication device include a MAC address of the communication device, service information of the communication device, an SSID of an access point in the communication device, a password, etc.

In the present embodiment, when the power of the communication device 151 is turned on, the short-range wireless communication unit 157 enters the advertising state, and starts transmitting advertisement information. However, the timing at which the short-range wireless communication unit 157 starts transmitting the advertisement information is not limited to that described above. For example, the short-range wireless communication unit 157 may start the transmission when a predetermined operation for enabling the BLE function is performed.

For example, when the short-range wireless communication unit 157 transmits first advertisement information and receives a scan response as a response to the first advertisement information from the information processing device 101, the short-range wireless communication unit 157 may transmit second advertisement information with a content different from that of the first advertisement information.

It is assumed by way of example that the first advertisement information includes information on the transmission power of the advertisement information, identification information identifying the short-range wireless communication unit 157, and the like. It is also assumed by way of example that the second advertisement information includes identification information identifying the communication device 151, information on a function and hardware included in the communication device 151, and the like. In such a configuration, for example, the printing application program is designed to handle the second advertisement information. Therefore, in the following description, it is assumed that the advertisement information handled by the printing application program is the second advertisement information.

An outline of GATT (Generic Attribute Profile) communication according to the BLE standard is described below. GATT is a profile for reading and writing (transmitting and receiving) information according to the BLE standard.

In GATT communication, two roles, that is, a GATT client and a GATT server, are defined based on a data sender and a data receiver.

The GATT client sends a request to the GATT server and receives a response from the GATT server. In the present embodiment, the information processing device 101 functions as a GATT client.

The GATT client can read information held in a storage area in a short-range wireless communication unit provided in the GATT server and can write information to the storage area.

When the GATT server receives a request from the GATT client, the GATT server returns a response to the GATT client. In the present embodiment, the communication device 151 functions as a GATT server, and the information processing device 101 functions as a GATT client. Note that the GATT server operates as a device for storing information such as status information of the GATT server.

Figure 10:
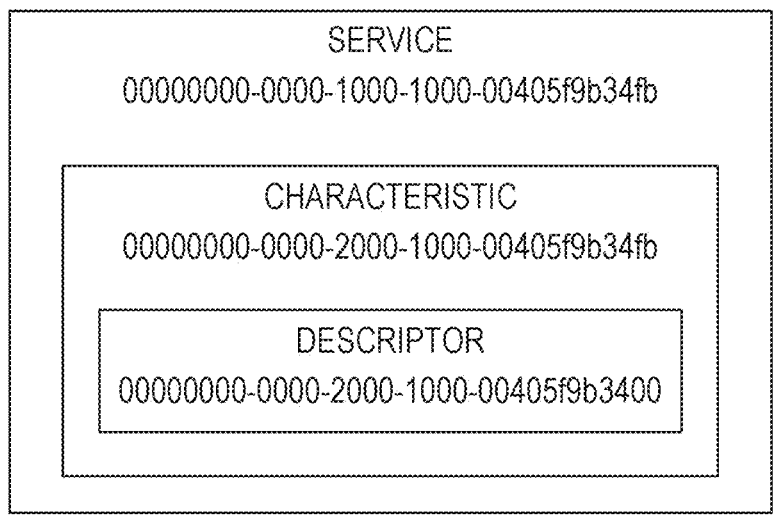
FIG. 10 is a diagram showing a data format of GATT according to one embodiment.

Next, a GATT data format is described. GATT data has a hierarchical structure as shown in FIG. 10, and includes three elements called a service, a characteristic, and a descriptor. The descriptor may not exist. In the present embodiment, it is assumed that no descriptor exists in GATT data configured by the short-range wireless communication unit 157. Services, characteristics, and descriptors each can be identified by a UUID (Universally Unique Identifier) expressed in 32 digits. The UUID referred to here is an identifier for uniquely identifying an object on software. The UUID is a 128-bit number, which is usually expressed in hexadecimal as, for example, 550e8400-e29b-41d4-a716-446655440000. Services, characteristics, and descriptors include those defined in the Bluetooth SIG standard and those specific to vendors. Vendor-specific UUIDs are expressed by 32 digits as described above, while UUIDs defined in the Bluetooth SIG standard are expressed by 4 digits. For example, a UUID defined in the Bluetooth SIG standard is expressed as 2A49.

Services are groups of attributes in GATT data grouped according to category, and each service includes one or more characteristics. A single value is set for each one of the characteristics. In the descriptor, an attribute value is set which is used when a characteristic needs additional information. To indicate whether to allow a GATT client to read or write services, characteristics, and descriptors, a read/write attribute may be set to each of services, characteristics, and descriptor.

By specifying a UUID of each of services and characteristics, the GATT client can execute read/write on a value set in a specified characteristic. However, whether or not the execution of read/write is allowed depends on the read/write attribute set for each service and characteristic.

FIG. 11 shows an example of GATT data constructed by the short-range wireless communication unit 157. In the GATT data shown in FIG. 11, "Service UUID" indicates a UUID assigned to each service. "Service Name" indicates a name of each service. "Characteristic UUID" indicates a UUID assigned to each characteristic. "Characteristic Name" indicates a name of each characteristic. "Service Readability" indicates whether or not the information processing device 101 is allowed to read a value related to each service. "Service Writability" indicates whether or not the information processing device 101 is allowed to write a value related to each service. "Characteristic Readability" indicates whether or not the information processing device 101 is allowed to read a value related to each characteristic. "Characteristic Writability" indicates whether or not the information processing device 101 is allowed to write a value related to each characteristic. "Characteristic Indictability" indicates whether or not, when the communication device 151 updates a value related to each characteristic, it is allowed to indicate (notify of) this fact to the information processing device 101. "Necessity of Pairing" indicates whether or not the information processing device 101 is allowed to read or write a value related to each characteristic only when pairing has been established. When "Service Readability" indicates "readable (o)" and "Characteristic Readability" indicates "readable (o)", the information processing device 101 is allowed to read a value related to a corresponding characteristic. When "Service Readability" indicates "readable (o)" and "Characteristic Readability" indicates "unreadable (field is blank)", the information processing device 101 is not allowed to read a value related to a corresponding characteristic. "Value" indicates a value set to each characteristic. When "Necessity of Pairing" indicates "pairing is not necessary (field is blank)", the information processing device 101 is allowed to read or write a value related to a corresponding characteristic even when the information processing device 101 is not paired with the communication device 151. However, when "Necessity of Pairing" indicates "pairing is necessary (o)", the information processing device 101 is not allowed to read or write a value related to a corresponding characteristic unless the information processing device 101 is paired with the communication device 151.

In order for the information processing device 101 to perform GATT communication with the communication device 151 via BLE, the information processing device 101 needs to grasp information regarding the configuration of the GATT data held by the communication device 151 (hereinafter referred to as GATT configuration data). The GATT configuration data includes data indicating, for example, the number of services in the GATT data, the number of characteristics, the value of each UUID, the attribute indicating readability, and the like, but the GATT configuration data does not include a value of each characteristic. A process performed by the information processing device 101 to acquire the GATT configuration data held by the communication device 151 is referred to as service discovery.

Note that the communication device 151 can recognize whether or not the communication with the information processing device 101 in the service discovery is successful for each communication. Therefore, the communication device 151 can recognize whether or not the service discovery by the information processing device 101 for acquiring the GATT configuration data of the communication device 151 is completed. Note that the completion of service discovery means that all the GATT configuration data of the communication device 151 is entirely acquired by the information processing device 101. In the present embodiment, the communication device 151 uses a management flag to manage which one of the information processing devices 101 has completed the service discovery for acquiring the GATT configuration data of the communication device 151 (in other words, whether each specific information processing device 101 has completed the service discovery for acquiring the GATT configuration data of the communication device 151). In a case where a change occurs in the GATT configuration as a result of updating firmware of the communication device 151 or for other reasons, the communication device 151 updates the management flags so as to indicate that service discovery for acquiring the (changed) GATT configuration data of the communication device 151 has not been completed by any information processing device 101.

In service discovery, first, the information processing device 101 transmits, to the communication device 151, a request (a discovery request) for acquiring the GATT configuration data of the communication device 151. When the communication device 151 receives the request, the communication device 151 transmits the GATT configuration data to the information processing device 101. In order to complete the service discovery, the transmission/reception of the discovery request and the transmission/reception of the GATT configuration data need to be repeated as many times as there are services, characteristics, and descriptors in the GATT data. However, there is a possibility that the transmission/reception of a discovery request or the transmission/reception of GATT configuration data stops or fails in the middle due to an instable communication or for other reasons. Thus, there is a possibility that service discovery fails. In this case, the service discovery is not completed, and thus the information processing device 101 has not acquired the entire GATT configuration data indicating the current GATT data configuration of the communication device 151.

There is also a possibility that after the information processing device 101 is connected once to the communication device 151 and the service discovery is completed, updating of the firmware of the communication device 151 is performed and thus a change occurs in the GATT configuration of the communication device 151. In this case, the information processing device 101 does not have GATT configuration data indicating the current configuration of the GATT data of the communication device 151 although the information processing device 101 has the GATT configuration data indicating the past configuration of the GATT data of the communication device 151.

As described above, there can be a state in which the information processing device 101 has not completely acquired the GATT configuration data indicating the current configuration of the GATT data of the communication device 151. However, even in such a state, there is a possibility that the information processing device 101 transmits a GATT communication request to the communication device 151. In such a case, the communication device 151 may notify the information processing device 101 that the information processing device 101 has not completely acquired the GATT configuration data indicating the current configuration of the GATT data of the communication device 151 thereby prompting the information processing device 101 to again execute service discovery.

DATABASE OUT OF SYNC has been added as a new error code (hereinafter referred to as a synchronization error) to the Bluetooth 5.1 communication method. This error code is an error code for notifying the information processing device 101 that the communication device 151 is requesting the information processing device 101 to execute the service discovery again. In other words, this error code is an error code for notifying the information processing device 101 that an error has occurred which indicates that the information processing device 101 has not completely acquired the GATT configuration data indicating the current configuration of the GATT data of the communication device 151. That is, this error code is not merely an error code for notifying that an error has occurred in BLE communication, but this error code can request the information processing device 101 to execute processing for solving the error. Thus, when the information processing device 101 receives this error code, the information processing device 101 can recognize that the GATT configuration data indicating the current configuration of the GATT data of the communication device 151 is not completely acquired, and that service discovery is to be executed again to resolve the error.

In view of the above, in the present embodiment, when a first condition is satisfied, the communication device 151 transmits a synchronization error to the information processing device 101 thereby executing an error notification using the synchronization error. The first condition is that the information processing device 101 supports 5.1 or a later version of BLE, and the communication device 151 receives a GATT communication request from the information processing device 101 although the information processing device 101 has not acquired complete GATT configuration data indicating the current configuration of the GATT data of the communication device 151. The first condition is not limited to that described above, and the first condition may be, for example, that the information processing device 101 supports 5.1 or a later version of BLE, and a predetermined time has elapsed since the start of service discovery without the service discovery being completed. Note that in a case where the information processing device 101 supports neither 5.1 nor a later version of BLE, even if the information processing device 101 receives an error code of a synchronization error, it cannot recognize the error code. In view of the above, in the present embodiment, when a second condition is satisfied, the communication device 151 transmits an error code of INVALID HANDLE to the information processing device 101 thereby executing an error notification using the error code of INVALID HANDLE. The error code INVALID HANDLE is, unlike the synchronization error, an error code supported by at least versions of BLE earlier than 5.1. The second condition is that the information processing device 101 supports neither 5.1 nor a later version of BLE, and the communication device 151 receives a GATT communication request from the information processing device 101 although the information processing device 101 has not acquired complete GATT configuration data indicating the current configuration of the GATT data of the communication device 151. The second condition is not limited to that described above, and the second condition may be, for example, that the information processing device 101 supports neither 5.1 nor a later version of BLE, and a predetermined time has elapsed since the start of service discovery without the service discovery being completed. Note that the error code INVALID HANDLE is, unlike the synchronization error, an error code that merely notifies of an occurrence of an error during BLE communication, and cannot notify what kind of error occurred during the BLE communication. Therefore, in a case where the second condition is satisfied, a value is written in a Service Changed characteristic, which is a characteristic for notifying of a change in GATT configuration, in the GATT data of the communication device 151, and the written content is notified to the information processing device 101. This causes the information processing device 101 to recognize that the information processing device 101 has not acquired complete GATT configuration data indicating the current configuration of the GATT data of the communication device 151.

In the present embodiment, when the first condition is satisfied, the above-described notification using the Service Changed characteristic is not executed, but this notification may be executed.

Thus, it is possible to adequately prompt the information processing device 101 to execute service discovery to start GATT communication.

Figure 4:
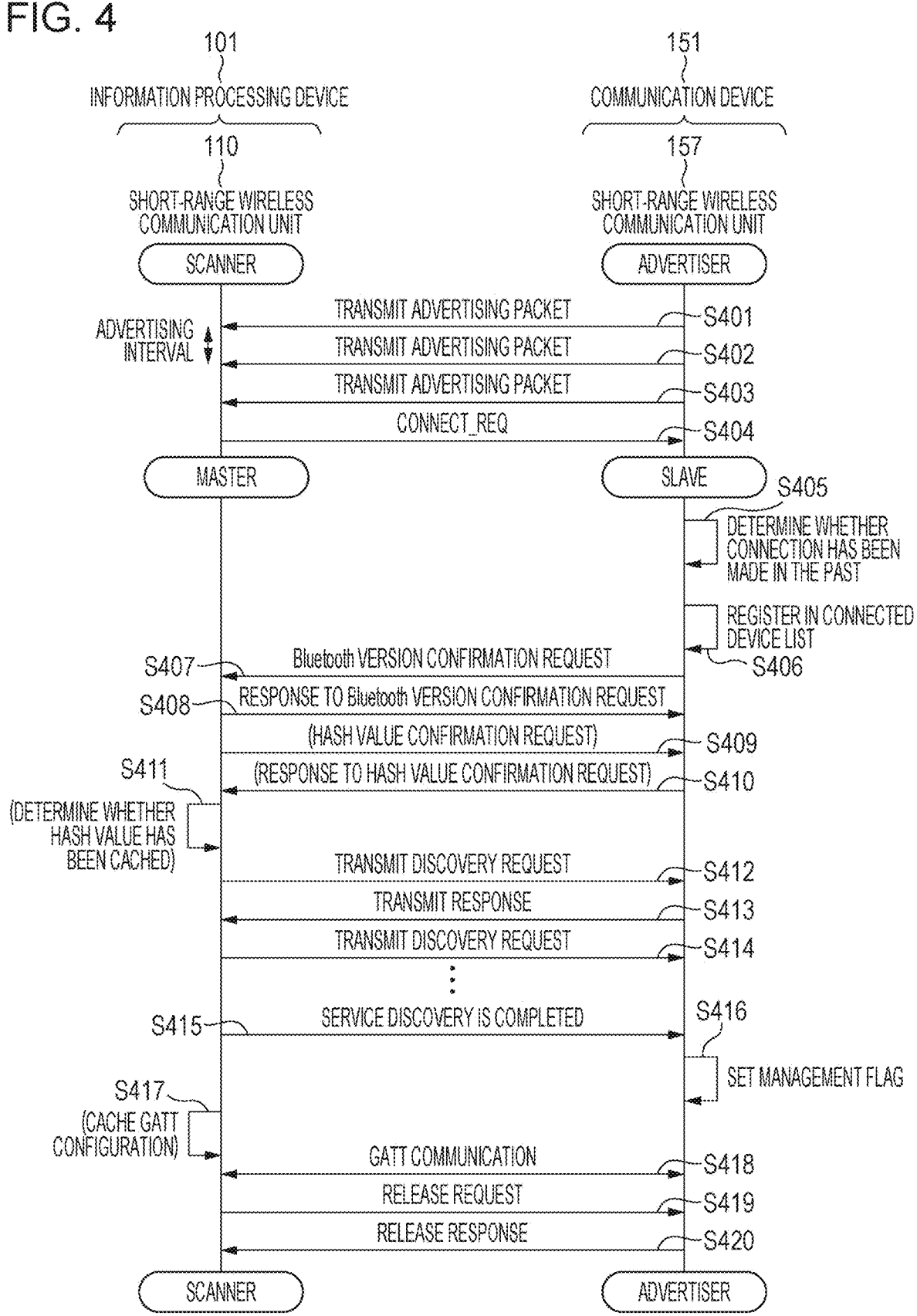
FIG. 4 is a sequence diagram of a process of a service discovery of GATT configuration data according to one embodiment.

FIG. 4 is a sequence diagram showing a process of service discovery of GATT configuration data, performed between the information processing device 101 and the communication device 151. In this sequence, the process performed by the communication device 151 is realized by the CPU 154 by loading a control program stored in the ROM 152 or an HDD (not shown) provided in the communication device 151 into the RAM 153 and executing the loaded control program. The process by the information processing device 101 is realized by the CPU 103 by loading a control program or a printing application program stored in the ROM 104 or an HDD (not shown) provided in the information processing device 101 into the RAM 105, and executing the loaded control program. The process by the information processing device 101 is automatically executed in response to activation of the printing application program on the information processing device 101. That is, when the printing application program is activated, the information processing device 101 starts receiving advertisement information by the printing application program.

The following description, it is assumed by way of example that the communication device 151 is an advertiser in the role of BLE and the information processing device 101 is a scanner in the role of BLE. In the present flowchart, the process is described for a case where the version of the Bluetooth function employed (supported) by the short-range wireless communication unit 110 is Bluetooth 5.1 and the service discovery is successful.

In S401 to S403, the short-range wireless communication unit 157 in the communication device 151 transmits (broadcasts) advertisement information. The information processing device 101 recognizes the existence of the communication device 151 by receiving, by the short-range wireless communication unit 110, the advertisement information transmitted from the short-range wireless communication unit 157. When the advertisement information is received in S401 to S403, the information processing device 101 may determine whether or not to execute processing in S404 and following steps. That is, the information processing device 101 may not perform analysis on all the received advertisement information in S404 and following steps. More specifically, the information processing device 101 determines whether or not the advertisement information includes information related to a printing application program. The information related to the printing application program is, for example, information indicating that a device, that is a sender of the advertisement information, has a printing function, information indicating a vendor that provides the printing application program, or the like. Another example of information related to the printing application program is information indicating that a device, that is a sender of the advertisement information, is of a type having a capability of issuing a print instruction by the printing application program. When the information processing device 101 receives the advertisement information and recognizes the communication device 151, the information processing device 101 acquires individual identification information included in the received advertisement information. In the present embodiment, the individual identification information uses a unique address called a BD address (Bluetooth Device Address) for identifying a device that supports Bluetooth, but the individual identification information is not limited to the BD address. For example, a MAC address, a serial number, a device name, or a model number of the communication device 151, or information according to a vendor specific format may be used as the individual identification information.

In S404, the information processing device 101 executes a process for connecting to the communication device 151 via BLE. More specifically, the short-range wireless communication unit 110 transmits CONNECT_REQ, which is a request for transitioning to a connection event for establishing a network connection by BLE. When the short-range wireless communication unit 157 receives CONNECT_REQ, the information processing device 101 and the communication device 151 prepare to transition to the connection event. More specifically, the short-range wireless communication unit 110 and the short-range wireless communication unit 157 respectively notify the CPU 103 and the CPU 154 that the connection process for GATT communication is completed.

Thereafter, the information processing device 101 and the communication device 151 respectively transition from a scanner and an advertiser to a master and a slave, and the information processing device 101 functioning as the master and communication device 151 functioning as the slave establish a connection (BLE connection) for GATT communication.

The communication device 151 determines in S405 whether or not the communication device 151 has been connected by BLE, in the past, to the device that is the sender of CONNECT_REQ received in S404. More specifically, the communication device 151 compares individual identification information included in CONNECT_REQ with individual identification information acquired from devices to which the communication device 151 has been connected via BLE in the past and stored in a memory (such as the ROM 152) provided in the communication device 151. In a case where a result of the comparison indicates that the two pieces of individual identification information match, the answer of the determination in step S405 is YES, and the process proceeds to S407. In a case where there is no matched individual identification information in the individual identification information acquired from the devices to which the BLE connection has been made in the past, the answer of the determination is NO, and the process proceeds to S406. In S406, the communication device 151 newly stores the individual identification information included in CONNECT_REQ in the memory (such as the ROM 152, etc.) provided in the communication device 151, and further sets a management flag associated with the above-described individual identification information to indicate that service discovery is not completed. In the present embodiment, it is assumed that the individual identification information is given by a BD address, but this is by way of example and not limitation. A specific example of a method of storing is to store BD addresses of connected devices in the form of a list as shown in FIG. 12, and store a management flag associated with each BD address. In the present embodiment, the management flag is set to 1 to indicate that service discovery is completed, while the management flag is set to 0 to indicate that service discovery is not completed. However, this is only by way of example, and other information may be used as long as it is possible to indicate whether or not service discovery is completed.

The individual identification information included in CONNECT_REQ may be a randomly generated BD address. In this case, the determination in S405 may be performed based on whether the received BD address can be decoded using a key called an IRK (Identity Resolution Key) stored in a memory (such as the ROM 152) provided in the communication device 151. In a case where decoding is possible, the answer of the determination in S405 is YES, but in a case where decoding is not possible, the answer of the determination in S405 is NO. It is assumed that the IRK key is stored in the memory (such as the ROM 152) provided in the communication device 151 in association with the information of each BD address.

In S407, the short-range wireless communication unit 157 transmits a request for confirmation of the version of Bluetooth to the short-range wireless communication unit 110.

In S408, when the short-range wireless communication unit 110 receives the confirmation request, the short-range wireless communication 110 transmits, to the short-range wireless communication unit 157, Bluetooth version information indicating the version of Bluetooth supported by the short-range wireless communication unit 110. The communication device 151 stores the acquired Bluetooth version information in a memory (such as the ROM 152) provided in the communication device 151. The Bluetooth version information may be stored in a connected device list such as that shown in FIG. 12, such that each Bluetooth version information is associated with a corresponding device in the list, or may be temporarily stored only while connected to the information processing device 101. Note that the Bluetooth version information indicates whether or not the short-range wireless communication unit 110 supports Bluetooth 5.1. As described above, in the present embodiment, it is assumed that the version of the Bluetooth function employed (supported) by the short-range wireless communication unit 110 is Bluetooth 5.1.

Next, in S409, the information processing device 101 starts executing service discovery for acquiring GATT configuration data of the communication device 151. That is, the information processing device 101 transmits, to the communication device 151, a request (a discovery request) for acquiring the GATT configuration data of the communication device 151. In response to the discovery request, the communication device 151 transmits a part of the GATT configuration data to the information processing device 101.

Based on the received part of the GATT configuration data, the information processing device 101 identifies an area where information of a type called a hash value is stored in the GATT data of the communication device 151, and reads the hash value. On receiving the hash value read request, the communication device 151 returns the hash value to the information processing device 101 in S410. The hash value is a value stored in the Database Hash characteristic with Characteristic UUID of 0x2B2A shown in FIG. 11. The communication device 151 stores, as the value of the Database Hash characteristic, a hash value calculated in advance by the communication device 151 from the configuration of the GATT data. That is, the hash value is a value uniquely determined according to the configuration of the GATT data of the communication device 151. Note a hash value, read from a device which has been connected to the information processing device 101 by BLE in the past, is stored in a memory (such as the ROM 104) provided in the information processing device 101.

Thus, in S411, the information processing device 101 makes a comparison to determine whether there is a hash value read in the past (a hash value that is stored in the memory provided in the information processing device 101) equal to the hash value read in S409. That is, the information processing device 101 confirms whether the same GATT configuration data as the GATT configuration data of the communication device 151 has been cached in the memory (such as the ROM 104) provided in the information processing device 101. In this process, the information processing device 101 may perform the determination based on not only the hash value, but also other additional information such as individual identification information such as the BD address of the communication device 151.

In a case where the answer of the determination in S411 is NO, the information processing device 101 continues the service discovery in S412 to grasp the rest of the GATT configuration data of the communication device 151. For the above purpose, in S412, the information processing device 101 transmits, to the communication device 151, a request (a discovery request) for acquiring the GATT configuration data of the communication device 151. Upon receiving the request, the communication device 151 transmits, in S413, the rest of the GATT configuration data to the information processing device 101. As described above, the transmission/reception of the discovery request and the transmission/reception of the GATT configuration data are repeated as many times as there are services, characteristics, and descriptors in the GATT data. That is, the transmission/reception of the discovery request and the transmission/reception of the GATT configuration data are repeated until the transmission is completed in S415 for all the GATT configuration data.

After the transmission of all GATT configuration data is completed, the communication device 151 sets, in S416, a management flag so as to indicate that the information processing device 101 being connected has completed service discovery for acquiring the GATT configuration data of the communication device 151. More specifically, the value of the management flag associated with the BD address of the information processing device 101 being connected, of the BD addresses of the connected devices shown in FIG. 12, is updated to 1, which is a value indicting the completion of service discovery. In S417, the information processing device 101 stores (saves) the GATT configuration data of the communication device 151 in a memory functioning as a cache provided in the information processing device 101. More specifically, the information processing device 101 stores the cached GATT configuration data of the communication device 151 in the memory in association with the hash value acquired from the communication device 151. In this storing process, the information processing device 101 may store additional other information such as individual identification information such as a MAC address of the communication device 151 in association with the above-described data. Furthermore, the information processing device 101 may store information indicating the time of caching in the memory in association with the GATT configuration data. In a case where the result of the determination in S411 is YES, the GATT configuration data of the communication device 151 has already been cached. Therefore, in this case, the information processing device 101 skips the processes from S412 to S417.

Acquiring the GATT configuration data of the communication device 151 makes it possible for the information processing device 101 to subsequently execute arbitrary GATT communication with the communication device 151. Thus, in S418, the information processing device 101 executes arbitrary GATT communication with the communication device 151.

In S419, after the GATT communication is completed, the information processing device 101 transmits a release request. Upon receiving the release request, in S420, the communication device 151 transmits a release response and terminates the BLE connection between the devices. When the BLE connection between the devices is ended, the information processing device 101 and the communication device 151 respectively return to the scanner and the advertiser, and the communication device 151 again starts the transmission of the advertisement information.

In the above-described example, since it is determined NO in S405, the information processing device 101 is then in a state where the information processing device 101 has not executed the service discovery on the communication device 151. Therefore, the communication device 151 sends a notification based on the determination result in S405 to the information processing device 101. In a case where the determination in S405 is NO, the information processing device 101 may omit the processes from S409 to S411. Then, the information processing device 101 may execute the service discovery without confirming the hash value.

In the present embodiment, as described above, the printing application program automatically causes the information processing device 101 to execute service discovery and cache information regarding the GATT data configuration of the communication device 151. This makes the service discovery allowed to be omitted in following operations even when a user instructs to establish a BLE connection between the information processing device 101 and the communication device 151. This makes it possible to quickly start processing executed after the BLE connection is established.

Note that in the present embodiment, it is assumed that the processes from S409 to S411 are executed by the OS on the information processing device 101. That is, when the OS of the information processing device 101 is instructed by the printing application program to establish a BLE connection in S404, the OS automatically executes the acquisition of the hash value and the service discovery. However, this is only by way of example and not limitation. For example, the processes from S409 to S411 may be executed in other manners according to the instruction issued by the printing application program.

Figure 5:
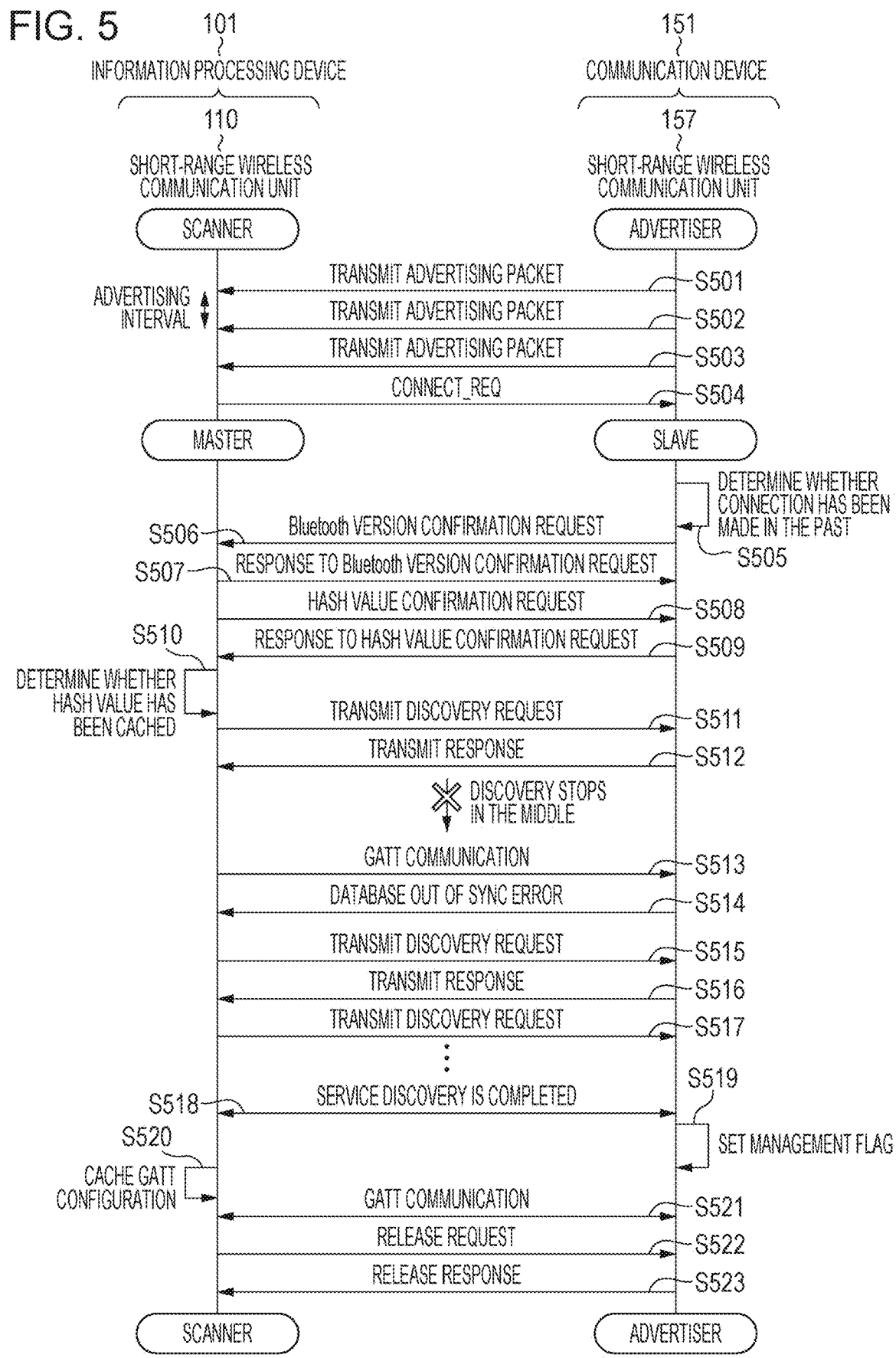
FIG. 5 is a sequence diagram of a process in which service discovery of GATT configuration data fails when a communication method is according to Bluetooth 5.1 according to one embodiment.

FIG. 5 is a sequence diagram showing an example of processing in which the version of the Bluetooth function supported by the short-range wireless communication unit 110 is Bluetooth 5.1 and the service discovery of the GATT configuration data fails. In this sequence, the process performed by the communication device 151 is realized by the CPU 154 by loading a control program stored in the ROM 152 or an HDD (not shown) provided in the communication device 151 into the RAM 153 and executing the loaded control program. The process by the information processing device 101 is realized by the CPU 103 by loading a control program or a printing application program stored in the ROM 104 or an HDD (not shown) provided in the information processing device 101 into the RAM 105, and executing the loaded control program. The process by the information processing device 101 is automatically executed in response to activation of the printing application program on the information processing device 101. That is, when the printing application program is activated, the information processing device 101 starts receiving advertisement information by the printing application program. In the processing shown in the present flowchart, it is assumed that the version of the Bluetooth function adopted (supported) by the short-range wireless communication unit 110 is Bluetooth 5.1 and the service discovery fails.

In the following description, it is assumed by way of example that the communication device 151 is an advertiser in the role of BLE and the information processing device 101 is a scanner in the role of BLE.

The processes from S501 to S505 are the same as the processes from S401 to S405, and thus a description thereof is omitted. In a case where the information processing device 101 is a device to which the communication device 151 has been connected once in the past, new registration to the connected device list is not performed. When it is determined that the connection has been established in the past, the communication device 151 determines, based on a management flag associated with a BD address, whether or not the information processing device 101 is a device that has completed service discovery. In a case where the result of the determination is NO, the communication the processing proceeds to S506. In a case where the information processing device 101 is a device that has completed service discovery and the result of the determination is YES, it is not necessary to perform the service discovery, and thus the processing proceeds to S521. The situation, in which the information processing device 101 has been connected in the past but has not completed service discovery, can occur, for example, when the information processing device 101 has connected in the past to the communication device 151 and completed service discovery in the past, but the GATT configuration data of the communication device 151 has been updated thereafter as a result of updating firmware or the like. Even in a case where the information processing device 101 has completed service discovery, if a service discovery request is transmitted from the information processing device 101, the GATT configuration data is transmitted to the information processing device 101.

Processes from S506 to S512 are the same as the processes from S407 to S413.

As described above, there is a possibility that service discovery fails. The failure of the service discovery may cause the above-described first condition to be satisfied. When the first condition is satisfied, the communication device 151 transmits, in S514, a synchronization error to the information processing device 101 and prompts the information processing device 101 to again execute service discovery.

When the information processing device 101 receives the synchronization error, the information processing device 101 again executes the service discovery. That is, in S515, the information processing device 101 again transmits a discovery request to the communication device 151. The processes from S515 to S523 are the same as the processes from S412 to S420, and thus a description thereof is omitted.

The above example has been described for the case where service discovery fails after S512 is performed, but there is a possibility that a failure of service discovery occurs in processing from S508 to S511. Also in this case, the first condition may be satisfied.

Figure 6:
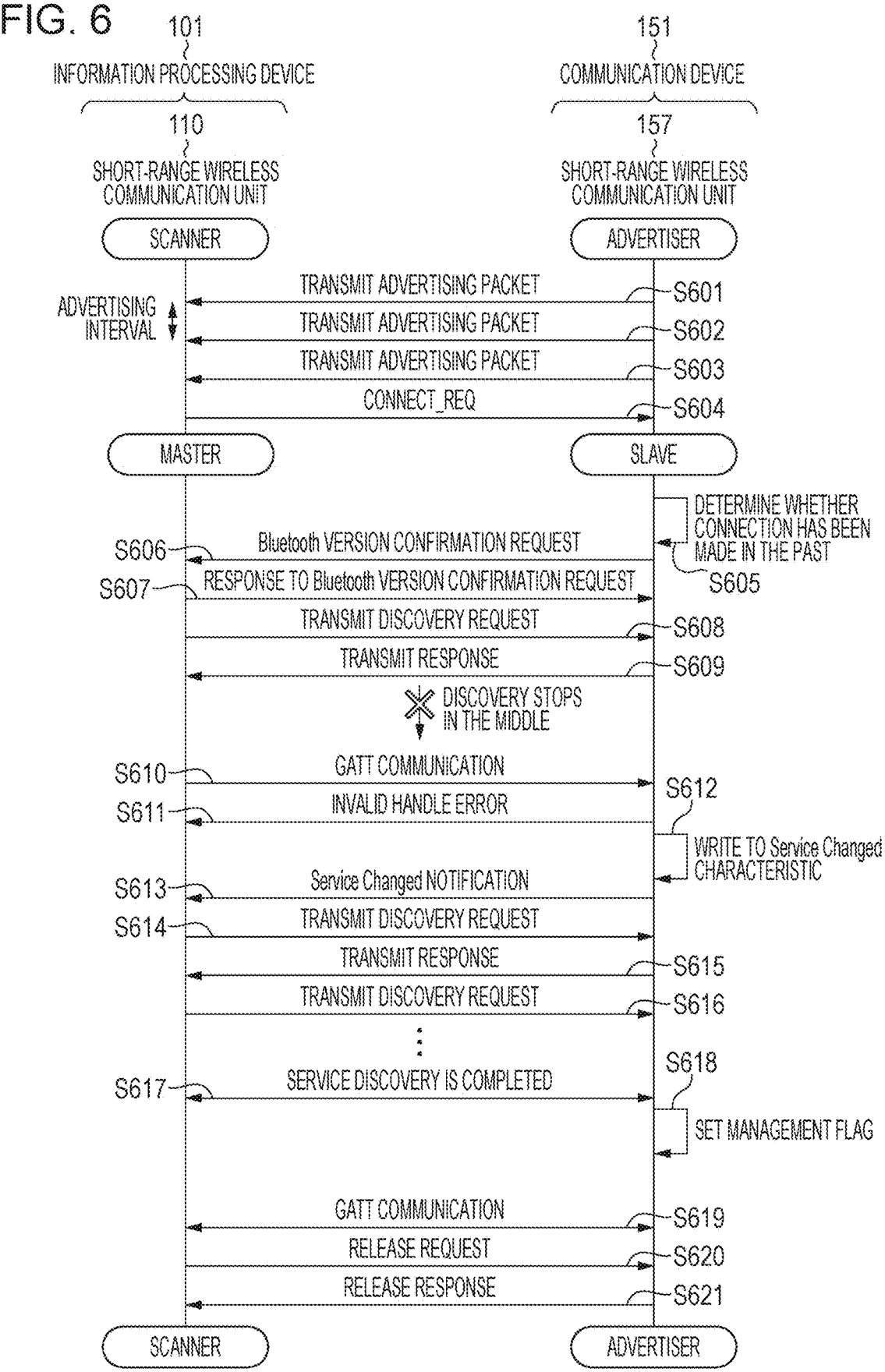
FIG. 6 is a sequence diagram of a process in which service discovery of GATT configuration data fails when a communication method is according to Bluetooth with a version earlier than 5.1 according to one embodiment.

FIG. 6 is a sequence diagram showing an example of processing in which the version of the Bluetooth function supported by the short-range wireless communication unit 110 is a version earlier than Bluetooth 5.1 and service discovery of the GATT configuration data fails. In this sequence, the process performed by the communication device 151 is realized by the CPU 154 by loading a control program stored in the ROM 152 or an HDD (not shown) provided in the communication device 151 into the RAM 153 and executing the loaded control program. The process by the information processing device 101 is realized by the CPU 103 by loading a control program or a printing application program stored in the ROM 104 or an HDD (not shown) provided in the information processing device 101 into the RAM 105, and executing the loaded control program. The process by the information processing device 101 is automatically executed in response to activation of the printing application program on the information processing device 101. That is, when the printing application program is activated, the information processing device 101 starts receiving advertisement information by the printing application program. In the processing shown in the present flowchart, it is assumed that the version of the Bluetooth function adopted (supported) by the short-range wireless communication unit 110 is not Bluetooth 5.1 and the service discovery fails.

The following description, it is assumed by way of example that the communication device 151 is an advertiser and the information processing device 101 is a scanner. Here, let it be assumed that the information processing device 101 has connected to the communication device 151 once in the past and has performed service discovery, but after disconnection, the firmware of the communication device 151 has been updated and thus a change has occurred in the GATT in the middle, and then reconnection has not been made even once. In this case, the information processing device 101 needs to perform service discovery again at a next connection. In a case where the GATT configuration is changed as a result of updating firmware of the communication device 151 or for other reasons, the communication device 151 updates all the information, in the connected device list, indicating whether or not discovery has been completed such that the all information is set to 0 to indicate that discovery has not been completed.

Processes from S601 to S607 are the same as the processes from S501 to S507, and thus a description thereof is omitted. However, in a case where the version of the Bluetooth function supported by the short-range wireless communication unit 110 is a version earlier than Bluetooth 5.1, the information processing device 101 does not support the hash value confirmation function. Therefore, the hash value confirmation process such as that in S508 to S511 is omitted, and the processing proceeds to S608.

S608 and S609 are the same as S511 and S512. As described above, there is a possibility that service discovery fails. The failure of the service discovery may cause the above-described second condition to be satisfied. When the second condition is satisfied, the communication device 151 transmits, in S611, an INVALID HANDLE error to the information processing device 101. The error transmitted here is not limited to the INVALID HANDLE error, but another error may be transmitted as long as it is defined in the version supported by the short-range wireless communication unit 110. Thereafter, in S612, a value for prompting the service discovery to be executed again is written in the Service Changed characteristic, and the written value is notified to the information processing device 101.

As a result, the discovery request is again transmitted from the information processing device 101 to the communication device 151, and the transmission of all GATT configuration data by the communication device 151 is completed. Thus, all service discovery is completed, and it becomes possible to execute GATT communication by reading or writing a characteristic value or the like.

When the information processing device 101 receives a notification given by writing to the Service Changed characteristic, the information processing device 101 again transmits, in S614, a service discovery request to the communication device 151. Processes from S614 to S621 are the same as the processes from S412 to S420, and thus a description thereof is omitted.

The above example has been described for the case where service discovery fails after S609 is performed, but there is a possibility that a failure of service discovery occurs in processing from S606 to S609. Also in this case, the second condition may be satisfied.

After the service discovery is successfully performed as described above, it becomes possible for the information processing device 101 to execute GATT communication with the communication device 151 using the acquired GATT configuration data. In the present embodiment, in the GATT communication, for example, the information processing device 101 performs a process of transmitting connection information for making a Wi-Fi connection to an external access point such as a wireless LAN router by the information processing device 101 to the communication device 151. When the communication device 151 receives the connection information, the communication device 151 tries to establish the Wi-Fi connection with an external access point based on the connection information. In another example, in the GATT communication, the information processing device 101 performs a process of receiving, from the communication device 151, connection information for establishing a peer-to-peer Wi-Fi connection with the communication device 151. When the information processing device 101 receives the connection information, the information processing device 101 tries to establish a Wi-Fi connection with the communication device 151.

Figure 7:
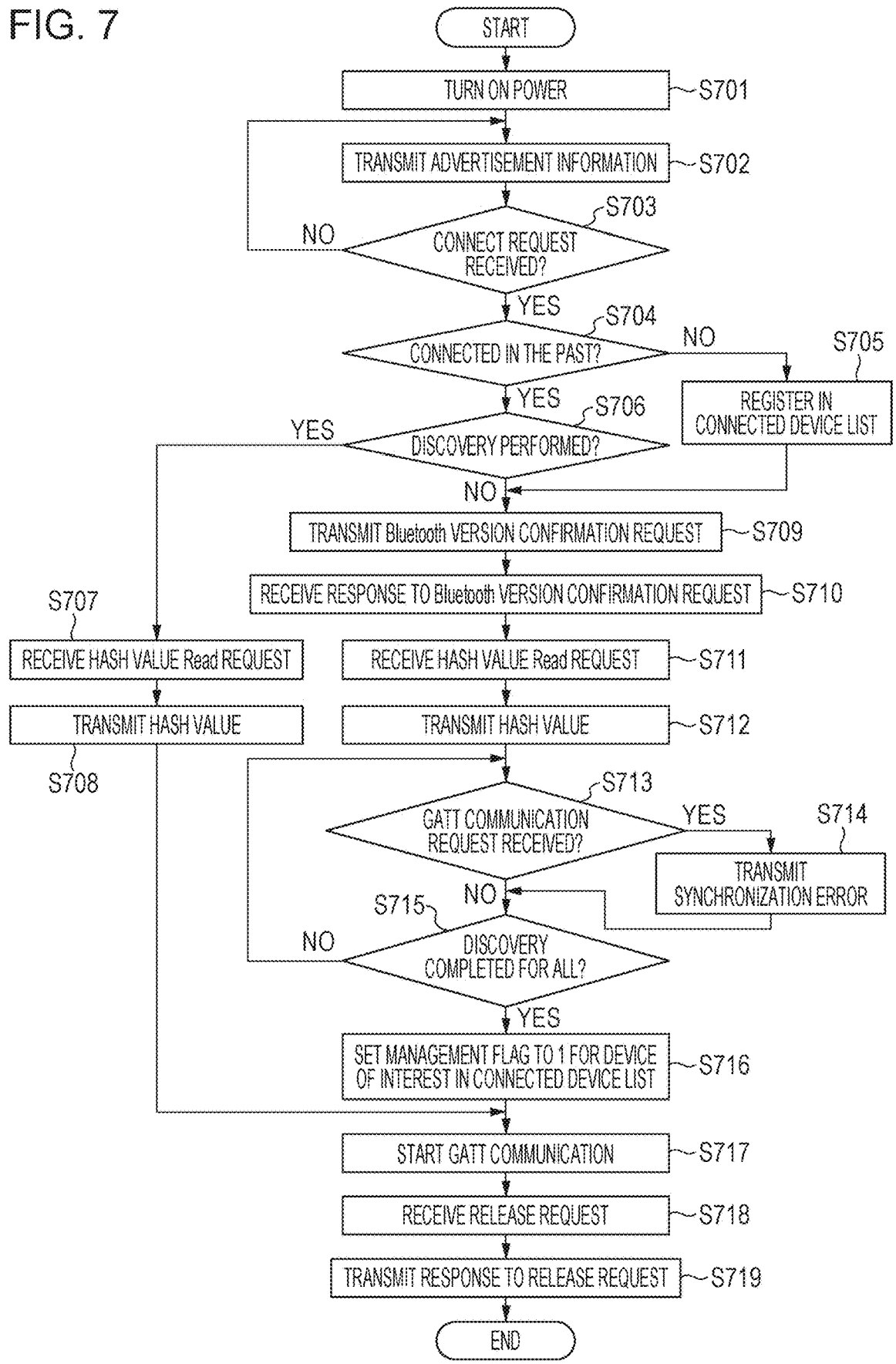
FIG. 7 is a flowchart showing a process in which service discovery of GATT configuration data fails when a communication method is according to Bluetooth 5.1 according to one embodiment.

FIG. 7 is a flowchart showing an example of processing executed by the communication device 151, in which the version of the Bluetooth function supported by the short-range wireless communication unit 110 is Bluetooth 5.1 and service discovery of the GATT configuration data fails.

This process is realized by the CPU 154 by loading a control program stored in the ROM 152 or an HDD (not shown) provided in the communication device 151 into the RAM 153 and executing the loaded control program. Note that this process is started when the power of the communication device 151 is turned on in S701.

In S701, the CPU 154 executes a process related to turning-on of the power of the communication device 151.

In S702, the CPU 154 transmits advertisement information.

In S703, the CPU 154 determines whether a connection request is received in response to the transmitted advertisement. Note that transmission of the advertisement information in S702 is repeated until a connection request is received. When it is determined in S703 that a connection request is received, the processing proceeds to S704. In this case, the transmission of the advertisement information in S702 is stopped. Alternatively, transmission of advertisement information in a format that does allow connection may be started.

In S704, the CPU 154 determines whether a BD address equal to the BD address included in the received connection request is founded in the connected device list stored in the ROM 152 or the HDD (not shown) provided in the communication device 151.

In a case where no matched BD address is found in S704, it is determined that connection has not been made in the past, and the processing proceeds to S705. In S705, the CPU 154 newly registers the BD address included in the received connection request in the ROM 152 or the HDD (not shown) provided in the communication device 151. In S705, since the discovery has not been completed yet, 0 indicating that discovery has not been completed is registered in the information indicating whether or not discovery has been performed in association with the registered BD address.

In a case where a matched BD address is found in S704, it is determined that connection has been made in the past, and the processing proceeds to S706. In S706, the CPU 154 makes a determination, based on the information described in the connected device list stored in the ROM 152 or the HDD (not shown) provided in the communication device 151, as to whether discovery has been performed by the device with the BD address from which the connect request was received in S703. In a case where discovery has been performed, the processing proceeds to S707. However, in a case where discovery has not been performed, the processing proceeds to S709.

In S709, the CPU 154 transmits a Bluetooth version confirmation request.

In S710, the CPU 154 receives a response to the transmitted Bluetooth version confirmation request. Here, it is confirmed whether the version of the Bluetooth function supported by the short-range wireless communication unit 110 is Bluetooth 5.1 or it is a version earlier than Bluetooth 5.1. In the example shown in FIG. 7, it is assumed that the information received in S710 indicates that the version of the Bluetooth function supported by the short-range wireless communication unit 110 is Bluetooth 5.1. Nothing is performed until the Bluetooth version confirmation information is received. Here, the CPU 154 may store the received Bluetooth version in association with a corresponding device described in the connected device list, shown in FIG. 12, stored in the memory (such as the ROM 152) provided in the communication device 151, or may temporarily store it in the RAM 153 or the like only during the connection.

In S707 and S711, the CPU 154 receives a hash value read request. In S708 and S712, the CPU 154 transmits a response to the hash value read request. Note that even when the version of the employed Bluetooth function Bluetooth 5.1, there is a possibility that a hash value read request is not received in S707 or S711. In this case, the processes from S707 to S708 and the processes from S711 to S712 may not be executed. When the process in S708 is completed, since it is already determined in S706 that the discovery has been performed, GATT communication is started in S717. When the process in S712 is completed, since it has been determined in S706 that discovery has not been performed, the process proceeds to S713 in which a further determination is performed.

In S713, the CPU 154 determines whether a GATT communication request such as a characteristic value read request or a characteristic value write request has been received before all service discovery is completed. In a case where a GATT communication request such as a characteristic value read request or a characteristic value write request has been received before all service discovery is completed, the processing proceeds to S714. In a case where a GATT communication request such as a characteristic value read request or a characteristic value write request has not been received, a determination is made in S715 as to whether service discovery has been entirely completed. Here the determination may be made such that when the GATT configuration data held by the short-range wireless communication unit 157 has been entirely transmitted, it is determined that service discovery has been entirely completed or the determination may be made such that when an arbitrary value is written in characteristic after GATT configuration data is transmitted, if a response to this is received, then it is determined that the service discovery is entirely completed at the time when the response is received. Note that the determination in S713 may be made such that when a next discovery request is not received in a predetermined period, a timeout is set, and if the timeout is reached, the processing proceeds to S714.

In S714, the CPU 154 transmits an error code called DATABASE OUT OF SYNC (a synchronization error), which has been newly defined in the communication method of Bluetooth 5.1, thereby prompting the GATT configuration data to be reacquired. In a period from when it is determined in S706 that discovery has not been performed to when it is determined in S715 that the discovery is entirely completed, the CPU 154 may transmit a GATT configuration change notification by updating the value of the Service Changed characteristic. However, the notification of GATT configuration change by updating the value of Service Changed characteristic is allowed to be performed only once during connection.

As described above, in the present embodiment, when discovery fails before the discovery is entirely completed or when a discovery request is not received, it is prompted to again execute the discovery by an optimum method adapted for the communication method. Thus, the discovery is executed again, and it becomes possible to normally perform a subsequent GATT communication.

When it is determined in S715 that the discovery is entirely completed, the processing proceeds to S716 in which the CPU 154 updates the management flag associated with the BD address included in the connection request received in S703 such that the management flag is set to 1.

In S717, the CPU 154 starts GATT communication by reading or writing a characteristic value.

After the GATT communication is completed, the CPU 154 receives a release request in S718.

When the release request is received, the CPU 154 transmits a release response in S719. Thus, the BLE connection between the devices is ended. When the BLE connection between the devices is ended, the communication device 151 returns to the advertiser, and the CPU 154 again starts transmitting advertisement information. In a case where advertisement information in a format that does not allow connection is transmitted, the transmission is stopped and then a connectable advertisement is transmitted.

Figure 8:
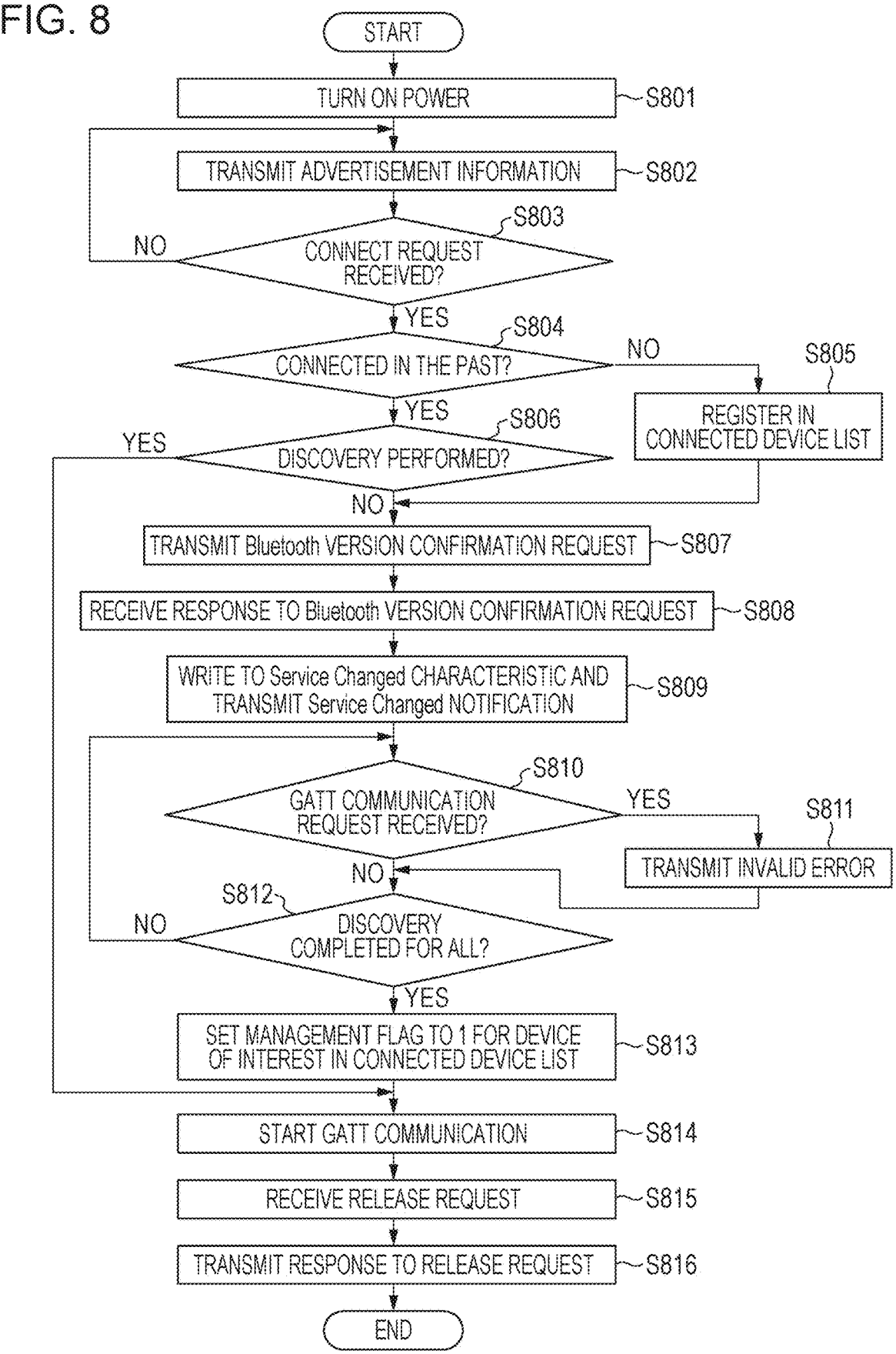
FIG. 8 is a flowchart showing a process in which service discovery of GATT configuration data fails when a communication method is according to Bluetooth with a version earlier than 5.1 according to one embodiment.

FIG. 8 is a flowchart showing an example of processing executed by the communication device 151, in which the version of the Bluetooth function supported by the short-range wireless communication unit 110 is one earlier than Bluetooth 5.1 and service discovery fails.

This process is realized by the CPU 154 by loading a control program stored in the ROM 152 or the HDD (not shown) provided in the communication device 151 into the RAM 153 and executing the loaded control program. Note that this process is started when the power of the communication device 151 is turned on in S801.

In S801, the CPU 154 executes a process related to turning-on of the power of the communication device 151.

In S802, the CPU 154 transmits advertisement information.

In S803, the CPU 154 determines whether a connection request in response to the transmitted advertisement is received. Note that transmission of the advertisement information in S802 is repeated until a connection request is received. When it is determined in S803 that a connection request is received, the processing proceeds to S804. In this case, the transmission of the advertisement information in S802 is stopped. Alternatively, transmission of advertisement information in a format that does allow connection may be started.

In S804, the CPU 154 determines whether a BD address equal to the BD address included in the received connection request is founded in the connected device list stored in the ROM 152 or the HDD (not shown) provided in the communication device 151.

In a case where no matched BD address is found in S804, it is determined that connection has not been made in the past, and the processing proceeds to S805. In S805, the CPU 154 newly registers the BD address included in the received connection request in the ROM 152 or the HDD (not shown) provided in the communication device 151. In S805, since the discovery has not been completed yet, 0 is registered in the management flag in association with the registered BD address.

In a case where a matched BD address is found in S804, it is determined that connection has been made in the past, and the processing proceeds to S806. In S806, the CPU 154 makes a determination, based on the information described in the connected device list stored in the ROM 152 or the HDD (not shown) provided in the communication device 151, as to whether service discovery has been performed by the device with the BD address from which the connection request was received in S803. In a case where service discovery has been completed, GATT communication is started in S814. In a case where service discovery has not been completed, the processing proceeds to S807.

In S807, the CPU 154 transmits a Bluetooth version confirmation request.

In S808, the CPU 154 receives a response to the transmitted Bluetooth version confirmation request. Here, it is confirmed whether the version of the Bluetooth function supported by the short-range wireless communication unit 110 is Bluetooth 5.1 or it is a version earlier than Bluetooth 5.1. In the example shown in FIG. 8, it is assumed that the information received in S808 indicates that the version of the Bluetooth function supported by the short-range wireless communication unit 110 is a version earlier than Bluetooth 5.1. Nothing is performed until the Bluetooth version confirmation information is received. Here, the CPU 154 may store the received Bluetooth version in association with a corresponding device described in the connected device list, shown in FIG. 12, stored in the memory (such as the ROM 152) provided in the communication device 151, or may temporarily store it in the RAM 153 or the like only during the connection.

Before S809, the GATT configuration was changed in the middle, and it was determined that the service discovery was not completed, and thus in S809 the CPU 154 transmits a notification of the change in the GATT configuration by updating the value of the Service Changed characteristic. Note that the timing of transmitting the GATT configuration change notification is arbitrary. For example, it may be transmitted after an error is transmitted in S811 described later, or it may be transmitted at any timing in a period from when it is determined in S806 that the service discovery is not completed to when the discovery is entirely completed in S812. However, the notification of GATT configuration change by updating the value of Service Changed characteristic is allowed to be performed only once during connection.

In S810, the CPU 154 determines whether a GATT communication request such as a characteristic value read request or a characteristic value write request has been received before all service discovery is completed. In a case where a GATT communication request such as a characteristic value read request or a characteristic value write request has been received before all service discovery is completed, the processing proceeds to S811. In a case where a GATT communication request such as a characteristic value read request or a characteristic value write request has not been received, a determination is made in S812 as to whether service discovery has been entirely completed. Here the determination may be made such that when the GATT configuration data held by the short-range wireless communication unit 157 has been entirely transmitted, it is determined that service discovery has been entirely completed, or the determination may be made such that when an arbitrary value is written in characteristic after GATT configuration data is transmitted, if a response to this is received, then it is determined that the service discovery is entirely completed at the time when the response is received. Note that the determination in S810 may be performed such that when a next discovery request is not received in a predetermined period, a timeout is set, and if the timeout is reached, the processing proceeds to S811.

When the version indicated by the information received in S808 is a version earlier than Bluetooth 5.1, even if a synchronization error is transmitted in S811, it is not recognized because the synchronization error is newly defined in the version of Bluetooth 5.1 and is not available in earlier versions. Therefore, in S811, CPU 154 transmits an error such as INVALID HANDLE (out-of-range handle access) that can be recognized even in versions earlier than Bluetooth 5.1. Here, in a case where a notification of a change in the GATT configuration has not been transmitted yet by updating a value of the Service Changed characteristic, the CPU 154 transmits in S811 the notification of the change in GATT configuration. As described above, in the present embodiment, when discovery fails before the discovery is entirely completed or when a discovery request is not received, it is prompted to again execute the discovery by an optimum method adapted for the communication method. Thus, the discovery is executed again, and it becomes possible to normally perform a subsequent GATT communication.

When it is determined in S812 that the discovery is entirely completed, the processing proceeds to S813 in which the CPU 154 updates the management flag associated with the BD address included in the connection request received in S803 such that the management flag is set to 1.

In S814, the CPU 154 starts GATT communication by reading or writing a characteristic value.

After the GATT communication is completed, the CPU 154 receives a release request in S815.

When the release request is received, the CPU 154 transmits a release response in S816. Thus, the BLE connection between the devices is ended. When the BLE connection between the devices is ended, the communication device 151 returns to the advertiser, and the CPU 154 again starts transmitting advertisement information. In a case where advertisement information in a format that does not allow connection is transmitted, the transmission is stopped and then a connectable advertisement is transmitted.

OTHER EMBODIMENTS

The embodiments have been described above, by way of example not limitation, for a case in which the communication device 151 is configured to switch the process depending on whether the version of Bluetooth supported by the short-range wireless communication unit 110 (that is, the information processing device 101) is 5.1 or a version earlier than 5.1. However, for example, the communication device 151 may be configured to execute only the process that can be executed when the version of Bluetooth supported by the short-range wireless communication unit 110 is 5.1.

In a case where the version of Bluetooth supported by the short-range wireless communication unit 110 is a version later than 5.1, the communication device 151 executes the same process as that executed when the version of Bluetooth supported by the short-range wireless communication unit 110 is 5.1. However, this is merely an example. For example, the communication device 151 may execute the same process as that executed when the version of Bluetooth supported by the short-range wireless communication unit 110 is a version earlier than 5.1, or the communication device 151 may execute a process different from the above-described process.

Various embodiments may also be realized by executing the following processing. That is, software (a program) that realizes the function of the above-described embodiment is loaded in a system or a device via a network or via one of various storage media, and a computer (a CPU, an MPU, or the like) of the system or the device reads and executes the program. The program may be executed on one computer or may be executed by a plurality of computers in conjunction with each other. In such embodiments, it is not necessary to realize all of the above-described processes by software. A part or all of the processes may be realized by hardware such as ASIC. All processes may not be executed by a single CPU, but may be executed by a plurality of CPUs as necessary in conjunction with each other.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-058382 filed Mar. 30, 2021, which is hereby incorporated by reference herein in its entirety.

What is claimed is:

1. A communication device configured to communicate with an information processing device by Bluetooth, comprising:
a transmission unit configured to, in a case where service discovery based on Bluetooth is started by the information processing device, transmit information regarding Generic Attribute Profile (GATT) data of the communication device to the information processing device; and
a notification unit configured to, in a case where a version of Bluetooth supported by the information processing device is a predetermined version and the service discovery by the information processing device is not completed, execute an error notification using an error code of DATABASE OUT OF SYNC, and, in a case where the version of Bluetooth supported by the information processing device is a version earlier than the predetermined version and the service discovery by the information processing device is not completed, execute an error notification using an error code of INVALID HANDLE.

2. The communication device according to claim 1, wherein in a case where the version of Bluetooth supported by the information processing device is the predetermined version and a GATT communication request from the information processing device is received when the service discovery by the information processing device is not completed, the error notification using the error code of DATABASE OUT OF SYNC is executed, and, in a case where the version of Bluetooth supported by the information processing device is a version earlier than the predetermined version and a GATT communication request from the information processing device is received when the service discovery by the information processing device is not completed, the error notification using the error code of INVALID HANDLE is executed.

3. The communication device according to claim 1, wherein in a case where the version of Bluetooth supported by the information processing device is the predetermined version and a predetermined time elapses since the start of the service discovery by the information processing device while the service discovery by the information processing device is not completed, the error notification using the error code of DATABASE OUT OF SYNC is executed, and, in a case where the version of the Bluetooth supported by the information processing device is a version earlier than the predetermined version and the predetermined time elapses since the start of the service discovery by the information processing device while the service discovery by the information processing device is not completed, the error notification using the error code of INVALID HANDLE is executed.

4. The communication device according to claim 1, further comprising a hash value transmission unit configured to, in a case where the version of Bluetooth supported by the information processing device is the predetermined version, transmit a specific hash value in the GATT data of the communication device to the information processing device,
wherein in a case where the specific hash value is equal to a value already held by the information processing device, at least a part of GATT configuration data indicating a configuration of the GATT data of the communication device is not transmitted to the information processing device after the specific hash value is transmitted, and, in a case where the specific hash value is not equal to a value already held by the information processing device, at least a part of the GATT configuration data is transmitted to the information processing device after the specific hash value is transmitted.

5. The communication device according to claim 1, wherein the service discovery by the information processing device is completed when the GATT configuration data indicating the configuration of the GATT data of the communication device is all acquired by the information processing device.

6. The communication device according to claim 1, further comprising an execution unit configured to, in a case where the error notification using the error code of INVALID HANDLE is executed, execute a predetermined process for notifying that the service discovery by the information processing device is to be executed again, wherein the predetermined process is different from the error notification using the error code of DATABASE OUT OF SYNC and different from the error notification using the error code of INVALID HANDLE.

7. The communication device according to claim 6, wherein the predetermined process is executed by writing a value in a Service Changed characteristic in the GATT data of the communication device.

8. The communication device according to claim 6, wherein in a case where the error notification using the error code of DATABASE OUT OF SYNC is executed, the predetermined process is not executed.

9. The communication device according to claim 1, wherein the predetermined version is a version of Bluetooth 5.1.

10. The communication device according to claim 1, wherein in a case where the version of Bluetooth supported by the information processing device is a version later than the predetermined version and the service discovery by the information processing device has not been completed, the error notification using an error code of DATABASE OUT OF SYNC is executed.

11. The communication device according to claim 1, wherein the communication device is a printing device.

12. The communication device according to claim 1, wherein Bluetooth used in communication with the information processing device is Bluetooth Low Energy.

13. The communication device according to claim 1, further comprising a communication unit configured to communicate, by Bluetooth, information for establishing a connection by an IEEE802.11 series communication method after the service discovery by the information processing device is completed.

14. A method for a communication device configured to communicate with an information processing device by Bluetooth, comprising:
   in a case where service discovery based on Bluetooth is started by the information processing device, transmitting information regarding Generic Attribute Profile (GATT) data of the communication device to the information processing device; and
   in a case where a version of Bluetooth supported by the information processing device is a predetermined version and the service discovery by the information processing device is not completed, executing an error notification using an error code of DATABASE OUT OF SYNC, and, in a case where the version of Bluetooth supported by the information processing device is a version earlier than the predetermined version and the service discovery by the information processing device is not completed, executing an error notification using an error code of INVALID HANDLE.

15. A non-transitory computer readable storage medium storing a program for causing a computer of a communication device configured to communicate with an information processing device by Bluetooth to execute:
   in a case where service discovery based on Bluetooth is started by the information processing device, transmit information regarding Generic Attribute Profile (GATT) data of the communication device to the information processing device; and
   in a case where a version of Bluetooth supported by the information processing device is a predetermined version and the service discovery by the information processing device is not completed, execute an error notification using an error code of DATABASE OUT OF SYNC, and, in a case where the version of Bluetooth supported by the information processing device is a version earlier than the predetermined version and the service discovery by the information processing device is not completed, execute an error notification using an error code of INVALID HANDLE.

* * * * *